United States Patent [19]
Sekikawa

[11] Patent Number: 6,075,636
[45] Date of Patent: Jun. 13, 2000

[54] OPTICAL SCANNING DEVICE

[75] Inventor: Yoshihito Sekikawa, Saitama, Japan

[73] Assignee: Fuji Xerox Co., Ltd., Tokyo, Japan

[21] Appl. No.: 09/196,232

[22] Filed: Nov. 20, 1998

[30] Foreign Application Priority Data

Nov. 21, 1997 [JP] Japan .................................. 9-321680

[51] Int. Cl.[7] .................................................. G02B 26/08
[52] U.S. Cl. ........................................ 359/204; 359/216
[58] Field of Search .......................... 359/204, 216–219; 347/233, 241–243, 250

[56] References Cited

FOREIGN PATENT DOCUMENTS 10-177147 6/1998 Japan .
10-206761 8/1998 Japan .

*Primary Examiner*—James Phan
*Attorney, Agent, or Firm*—Finnegan, Henderson, Farabow, Garrett & Dunner, L.L.P.

[57] ABSTRACT

An optical scanning device comprises a multi-faceted rotating polygon mirror for deflecting an incident beam in main scanning direction, a first light source for bringing a first beam into incidence on the polygon mirror at an angle of $+\alpha$ with respect to a central line connecting from a rotation center of the polygon mirror to a central position of a scanned surface, the first light source arranged such that the first beam is deflected at an angle of $-2\alpha$ by while the polygon mirror rotates at an angle of $\alpha$, a second light source for bringing a second beam into incidence on the polygon mirror at an angle of $-\alpha$ with respect to the central line, the second light source arranged such that the second beam is deflected at an angle of $-2\alpha$ by while the polygon mirror rotates at an angle of $\alpha$, a first reflecting mirror for scanning the scanned surface by reflecting the deflected first beam, the first reflecting mirror arranged so one end portion thereof as to cross over the central line and to avoid an unnecessary beam from reflection faces adjoining to a normal reflection face of the polygon mirror, and a second reflecting mirror for scanning the scanned surface by reflecting the deflected second beam.

11 Claims, 7 Drawing Sheets

OPTICAL SCANNING DEVICE

BACKGROUND OF THE INVENTION

The present invention relates to an optical scanning device in use with an image recording apparatus which records an image on a recording medium by scanning a surface of the recording medium with a laser beam containing image information.

Conventionally, an optical scanning device which employs a divisional scanning method based on an overfilled optical system in order to satisfy the market demands of increasing the operation speed and resolution performances of the image processing apparatus and to obtain a wide scan width without increasing the focal distance (optical path length), which is shown in Unexamined Japanese Patent Publication No. Hei 10-177147.

The proposed optical scanning device is basically composed of two light source members 40A and 40B, two first optical systems 42A and 42B respectively provided for the light source members 40A and 40B, a polygon mirror (multi-faceted rotating polygon mirror) 12 which receives laser beams modulated by an image signal and repeatedly deflects the laser beams every line of the image signal, and a single second optical system 48 which substantially uniformizes the scanning speed of the deflected laser beam over a photosensitive body 46 (surface to be scanned) and focuses the laser beam at a position near the photosensitive body 46.

The optical scanning device is designed so as to satisfy the following condition $$\frac{360°}{n} \times 0.6 < \alpha < \frac{360°}{n}$$

provided that a scan angle by the deflection is $\pm 2\alpha$; the incident angles of the two beams when incident on the same facet of the polygon mirror 12 are $-\alpha$ and $+\alpha$ in the main scanning direction with respect to a center line CL connecting the rotational center of the polygon mirror 12 to the center position on the photosensitive body 46; a rotation angle of the polygon mirror 12 is equal to the incident angle of the two laser beams, $$\alpha\left(\pm\frac{\alpha}{2}\right);$$

and the number of facets of the polygon mirror 12 is n.

Of the two laser beams, the laser beam A (indicated by a dotted line) scans a range from ① to ② at a scan angle of $-2\alpha$, while at the same time the laser beam B (indicated by a solid line) scans a range from ③ to ④ at a scan angle of $+2\alpha$.

This double-beam and surface-division scanning method succeeds in suppressing such a phenomenon essential to the surface-division scan based on the overfilled optical system; the uniformity of the beam diameter on the surface of the photosensitive body 46 is deteriorated in linking with a variation of the F-number (equivalent to "brightness" in the field of the camera) and the beam diameter difference appears at the central position of scanning.

As seen from FIG. 6, where the overfilled optical system is used, the width (Do) of the bundle of rays of incident light is larger than the width of the facet of the polygon mirror 12. Therefore, the light beams incident on the facet a preceding to the reflecting facet b (facet a: located on the mirror rotation start side) and the facet c succeeding to the same (facet c: located on the mirror rotation end side) are reflected by those facets, and the reflected ones are unnecessary light N.

As shown in FIG. 1, the laser beam A scans the range from ① to ② while at the same time the unnecessary light $N_A$ scans the range from ③ to ④. The laser beam B scans the range from ③ to ④ while at the same time the unnecessary light $N_B$ scans the range from ① to ②. Thus, the unnecessary light doubly writes its image on the photosensitive body surface having an image already written therein.

To avoid this double writing problem, as shown in FIGS. 7 and 8, there had been proposed an optical scanning device in which the laser beams A and B are incident on the surface of the photosensitive body 46 at different incident angles $\beta 1$ and $\beta 2$ in the sub scanning direction, and reflecting mirrors 50A and 50B are provided for the laser beams, respectively, which is shown in Unexamined Japanese Patent Publication No. Hei 10-206761.

With this optical arrangement, the laser beams deflected by the polygon mirror 12 at different angles in the sub scanning direction, and those beams are sufficiently spaced from each other in the sub scanning direction at a position where the reflecting mirrors 50A and 50B are disposed. Therefore, there is no chance that the unnecessary light $N_A$ and $N_B$ hits the reflecting mirrors not associated with these beams of unnecessary light.

Specifically, the unnecessary light $N_A$ (indicated by dashed line) of the laser beam A does not hit the reflecting mirror 50B provided for reflecting the laser beam B and is not reflected by the same. Similarly, the unnecessary light $N_B$ of the laser beam B does not hit the reflecting mirror 50a provided for reflecting the laser beam A and is not reflected by the same. Therefore, the double writing problem can be avoided.

However, this approach encounters another difficulty to secure formation of the dot at the central position of scanning (joining point or position between the laser beams A and B).

This will be briefly described with reference to FIG. 9. Where the beam diameter $\omega_0$ is several tens $\mu m$ on the photosensitive body 46 in the main scanning direction, the beam diameter is several mm on each of the reflecting mirrors 50A and 50B that are disposed on the optical paths ranging to the photosensitive body 46. As a result, each reflecting mirror fails to receive some part of the laser beam, and the laser beam of an imperfect beam diameter appears at the central position of scanning. In this case, the dot formed is deformed in its shape.

Accordingly, an object of the present invention is to provide an optical scanning device which solves the problem of the double writing by unnecessary light and secures the formation of the dot in the vicinity of the central position of scanning, even if the overfilled optical system is used.

SUMMARY OF THE INVENTION

In the optical scanning device defined in claim 1, two laser beams are emitted from two light source members and are incident on the same facet of the polygon mirror at angles $-\alpha$ and $+\alpha$ in the main scanning direction with respect to a center line connecting the center of rotation of the polygon mirror to the center position on the photosensitive body, and at different angles in the sub scanning direction.

In order to achieve the above object, there is provided an optical scanning device comprising: a multi-faceted rotating polygon mirror for deflecting an incident beam in main scanning direction; a first light source for bringing a first beam into incidence on the polygon mirror at an angle of $+\alpha$ with respect to a central line connecting from a rotation center of the polygon mirror to a central position of a scanned surface, the first light source arranged such that the first beam is deflected at an angle of $-2\alpha$ by while the polygon mirror rotates at an angle of $\alpha$; a second light source for bringing a second beam into incidence on the polygon mirror at an angle of $-\alpha$ with respect to the central line, the second light source arranged such that the second beam is deflected at an angle of $+2\alpha$ by while the polygon mirror rotates at an angle of $\alpha$; a first reflecting mirror for scanning the scanned surface by reflecting the deflected first beam, the first reflecting mirror arranged so one end portion thereof as to cross over the central line and to avoid an unnecessary beam from reflection faces adjoining to a normal reflection face of the polygon mirror; and a second reflecting mirror for scanning the scanned surface by reflecting the deflected second beam.

Namely, the deflected first and second beams are reflected by the first and second reflecting mirrors to scan an associated half area of the scanned surface. Here, since the end portion of the first mirror is arranged so as to cross the central line, whole diameter of the beam is completely reflected. Therefore, the dot perfectly configured in diameter can be formed in the vicinity of the central position of scanning (joining position between the two beams).

Further, since the end portion of the first mirror is arranged so as to avoid the unnecessary beam from the polygon mirror, the unnecessary beam is not reflected, thereby the double writing can be prevented.

In order to obtain the perfect dot and to avoid the double writing problem, length $L_1$ from the end portion to the central line may be set so as to satisfy the following expression, $$\frac{\omega_1}{2} < L_1 < D_1 - \frac{\omega_1}{2},$$

where $\omega_1$ is diameter of the first beam in the main scanning direction at a surface of the first reflection mirror; and $D_1$ is distance between the central line and the unnecessary beam.

The $D_1$ is determined in accordance with the position of the reflecting mirror, an angle of the appearance of the unnecessary beam with respect to the central line, and various dimensions of the image-forming optical system (f$\theta$ lenses).

The length $L_1$ may be set so as to satisfy the following expression, $$\frac{\omega_1}{2} < L_1 < D_1.$$

Setting the value L1 so as to be larger than a half of the diameter of the beam, a perfect dot formation in the central position of scanning is secured.

The length $L_1$ may be set so as to satisfy the following expression, $$\frac{\omega_1}{2} + \frac{2X_1}{X_1 + Y_1} < L_1 < D_1,$$

where $X_1$ is physical distance on the optical axis between the polygon mirror and the first reflecting mirror; and $Y_1$ is physical distance between the first reflecting mirror and the scanned surface.

The above condition is set up to cope with the losing of side registration arising from mounting errors of optical parts and errors produced when the optical scanning device is assembled into the image forming apparatus.

A quantity of misregistration of the side registration is approximately 2 mm. A quantity of an error on the reflecting surface of the reflecting mirror is $$\frac{2X_1}{X_1 + Y_1}.$$

Therefore, the beam joining position may be easily adjusted by changing the position of the dot as visual representation of image data by selecting the projecting length of the cylindrical mirror to be larger than $$\frac{\omega_1}{2} + \frac{2X_1}{X_1 + Y_1}.$$

The length $L_1$ may be set so as to satisfy the following expression, $$\frac{\omega_1}{2} + \frac{2X_1}{X_1 + Y_1} + a_1 < L_1 < D_1,$$

where $\alpha_1$ is distance between the end portion of the first reflecting mirror and an effective reflecting face.

This condition is set up for the following reason. The end of the reflecting mirror is rounded for the measure for the nonuniform coating and safety. Therefore, it is necessary to subtract the distance $\alpha_1$ (generally about 1 mm) from the end to specify the effective reflecting surface of the reflecting mirror.

In the device, also the second reflecting mirror may be arranged so one end portion thereof as to cross over the central line and to avoid the unnecessary beam. In this case, length $L_2$ from the end portion to the central line may be set so as to satisfy one of the following expressions.

$$\frac{\omega_2}{2} < L_2 < D_2 - \frac{\omega_2}{2},$$

$$\frac{\omega_2}{2} < L_2 < D_2,$$

$$\frac{\omega_2}{2} + \frac{2X_2}{X_2 + Y_2} < L_2 < D_2, \text{ and}$$

$$\frac{\omega_2}{2} + \frac{2X_2}{X_2 + Y_2} + a_2 < L_2 < D_2,$$

where $\omega_2$ is diameter of the second beam in the main scanning direction at a surface of the second reflection mirror; $D_2$ is distance between the central line and the unnecessary beam; $X_2$ is physical distance on the optical axis between the polygon mirror and the second reflecting mirror; $Y_2$ is physical distance between the second reflecting mirror and the scanned surface; and $\alpha_2$ is distance between the end portion of the second reflecting mirror and an effective reflecting face.

In the device, a scanning start signal, which is generated to control a writing start position before starting the scanning for the scanned surface, may be served for controlling writing start positions of the first beam and the second beam.

Accordingly, the angle range allowing the beam deflected by the rotation-end face of the polygon mirror to illuminate is confined within the printing area. As a result, the angle ranges allowing both the beams to illuminate are reduced. The region to cause the unnecessary beam is minimized, so that a degree of freedom to mount the cylindrical mirror is increased.

In the device, a first scanning start signal, which is generated to control a writing start position before starting the scanning for the scanned surface, may be served for controlling a writing start position of the first beam, and a second scanning start signal, which is generated to control a next writing start position after terminating the present scanning, may be served for controlling a writing start position of the second beam.

Accordingly, the angle ranges allowing the beams to illuminate is large, and the region causing the unnecessary light is also large. However, when a joining position between the two beams is adjusted, the positions of those beams can be detected independently, and hence it is very useful for the electrical adjustment.

DETAILED DESCRIPTION OF THE PREFERRED EMBODIMENTS

Figure 1:
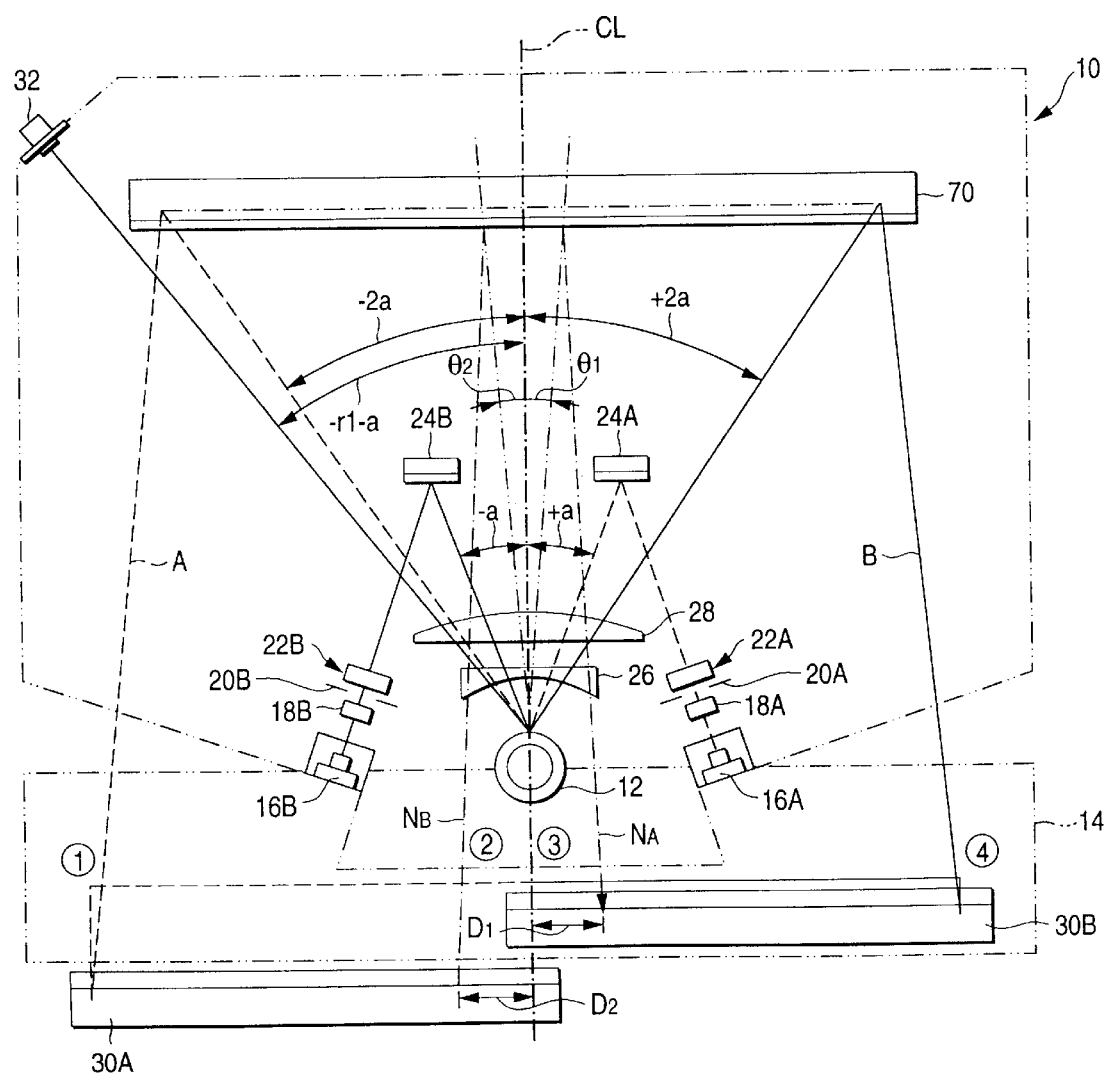
FIG. 1 is a schematic diagram showing an optical scanning device according to one embodiment of the present invention.

As shown in FIG. 1, two light source members 16A and 16B are disposed symmetrically with respect to a center line CL connecting a rotation center of a multi-faceted rotating polygon mirror 12 and a central position of scanning. Each of the light source members 16A and 16B is constructed with a semiconductor laser that emits a laser beam of which the light intensity distribution resembles a Gaussian distribution.

Figure 2:
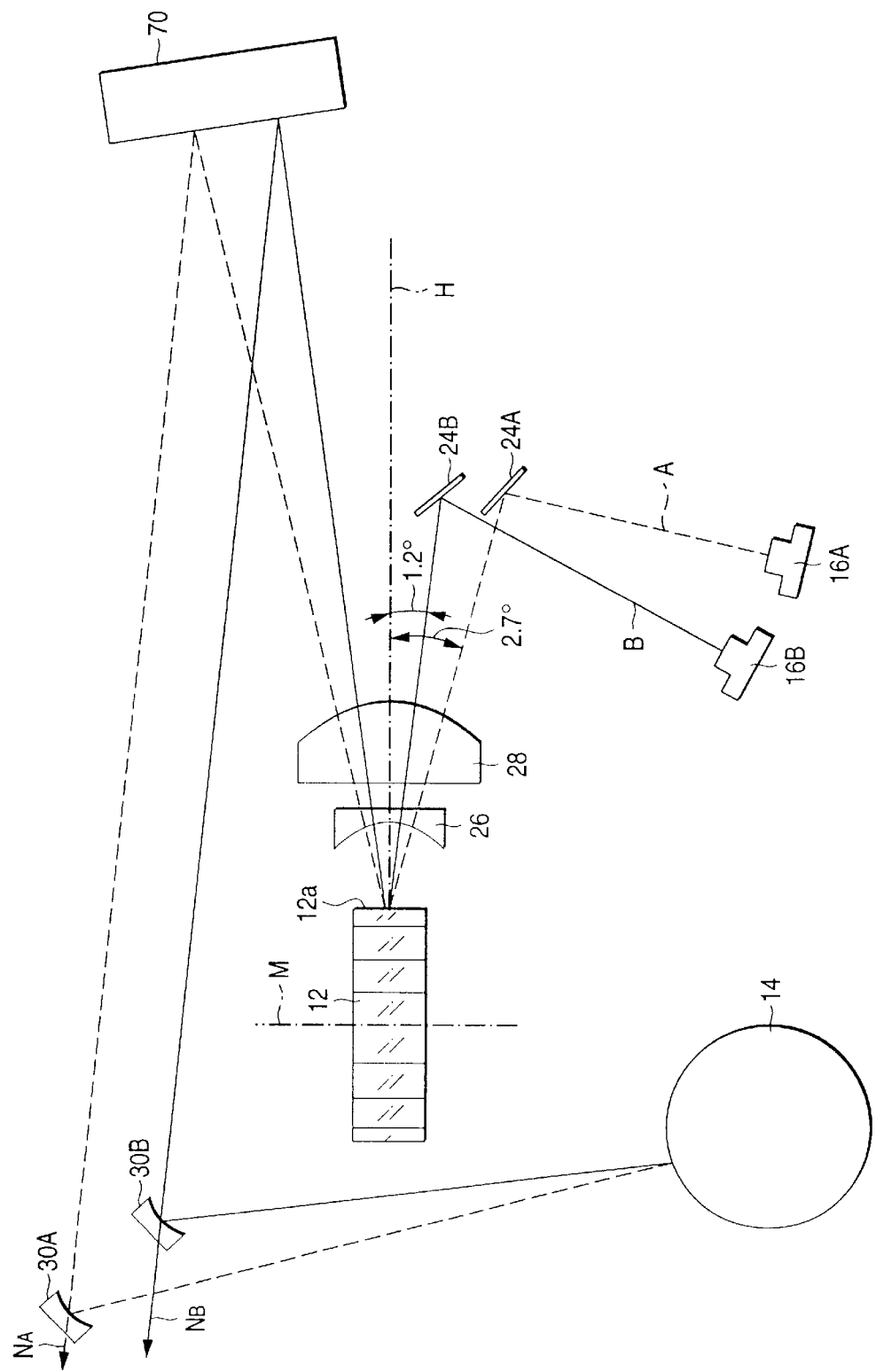
FIG. 2 is a schematic side view showing the optical scanning device of FIG. 1.

A laser beam emitted from the light source members 16A is referred to as a laser beam A (indicated by a dashed line), and a laser beam from the light source members 16B is referred to as a laser beam B (indicated by a solid line). The light source members 16A and 16B are disposed as shown in FIG. 2: a laser beam A is emitted from the light source members 16A and is incident on a facet 12a of the polygon mirror 12 at an angle of 1.2 degrees with respect to a plane H perpendicular to the rotation axis M of the polygon mirror 12; and a laser beam B is emitted from the light source members 16B and is incident on the same facet 12a at an angle of 2.7 degrees with respect to the plane H.

The beam is emitted from the light source members 16A (16B) of which the vertical and horizontal spread angles are different from each other, and is substantially collimated by a collimator lens 18A (18B). In this case, the laser light emanating from the collimator lens 18A (18B) becomes gentle diverging light. This is because in this instance, distance between the collimator lens 18A (18B) and the light source members 16A (16B) is shorter than the focal length by about 1 mm.

Immediately after emerging from the collimator lens, the diverging light beam enters a beam-shaping slit 20A (20B) which in turn allows only the central part of the diverging light beam to pass therethrough. The light beam thus filtered passes through a cylindrical lens 22A (22B), and is optically processed so that it is focused in the sub scanning direction at a position near the facet of the polygon mirror 12.

After passing through the cylindrical lens 22A (22B), the light beam is reflected by a reflecting mirror 24A (24B), those mirrors 24A and 24B being disposed symmetrically with respect to the center line CL. The reflecting mirror 24A reflects the beam A to bring into incidence to the facet 12a of the polygon mirror 12a +αto (12.8 degrees) with respect to the center line CL in the main scanning direction and at 1.2 degrees in the sub scanning direction. The reflecting mirror 24B reflects the beam B to bring into incidence to the same facet at −α (−12.8 degrees) in the main scanning direction and at 2.7 degrees in the sub scanning direction.

At set of fθ lenses 26 and 28 each having a power only in the main scanning direction is disposed between the reflecting mirrors 24A and 24B and the polygon mirror 12. After passing through the set of fθ lenses 26 and 28, the beam A(B) is brought into incidence to the polygon mirror 12 in the form of substantially parallel rays of light (Do) whose distribution area is larger than the facet area of the polygon mirror 12 (see FIG. 6).

The laser beam A deflected by the polygon mirror 12 passes through the set of fθ lenses 26 and 28 again; is reflected by a cylindrical mirror 30A; and focuses on a photosensitive body 14. Similarly, the laser beam B that is deflected by the polygon mirror 12 also passes through the set of fθ lenses 26 and 28 again; is reflected by a cylindrical mirror 30B; and focuses on a photosensitive body 14.

The cylindrical mirror 30A (30B) is provided for correcting shifts of the scan position (called a plane slant error) caused by a variation of slants of the respective reflecting surfaces in the sub scanning direction. As will be described later, respective one end of the cylindrical mirrors 30A and 30B are projected beyond the center line CL by distances $L_1$ and $L_2$.

The beam spots behaves on the photosensitive body 14 through the function of the set of fθ lenses 26 and 28 in the following divisional manner. The spot of the beam A moves in the direction from ① to ② at substantially constant speed on the surface of the photosensitive body 14 in the main scanning direction, and the spot of the laser beam B moves in the direction from ③ to ④ at substantially constant speed on the same surface as well.

After the scanning of one line ends, the beams A and B are deflected by the next facet of the polygon mirror 12 to scan the next line on the surface of the photosensitive body 14 in the double-beam surface-division manner.

An SOS (start of scan) sensor 32 is located on the path of the laser beam A passing through the set of fθ lenses 26 and 28 in order to set up a start position of writing an image by those scan lines. The SOS sensor 32, connected to a controller (not shown), senses a laser beam and produces an SOS signal before the scanning of the surface of the photosensitive body 14 starts, for the purpose of controlling the scan or writing by the beams. The controller detects a signal from the SOS signal sensor 32, and starts the modulation of the beams by an image signal after a preset time elapses from the signal detection.

Synchronizing with the output signal of SOS sensor 32, modulation of the beam B is started after the preset time is elapsed. Thus the beam B scans in the direction from ③ to ④ in harmony with that the beam A scans in the direction ① to ②.

An operation of the optical scanning device according to this embodiment will be described below.

The beams A and B, as shown in FIG. 1, are brought into incidence to the polygon mirror 12 at angles of ±α, which is a half of a scanning range angle ±2α with respect to the center line CL passing through the central position of scanning.

A scanning angle of the polygon mirror 12 (scan angle: rotation angle developed by the polygon mirror 12 during the scan defined by the scan range angle of ±2α) is selected to be equal to the incident angle α(=±α/2) of the laser beam B. Therefore, during a time period that the polygon mirror 12 rotates by an angular quantity of α, the spot of the laser beam A scans the photosensitive body surface over the range from ① to ②, while at the same time the spot of the laser beam B scans the same over the range from ③ to ④.

Further, in the case of adopting the divisional scanning method based on an overfilled optical system, the size of the polygon mirror 12 can be reduced. Therefore, it is possible that the operation speed and the resolution performance of the optical scanning device may be improved without increase of the focal distance.

As stated above, the incident angle of the laser beam A in the sub scanning direction 1.2 degrees and that of the laser beam B is 2.7 degrees. In this connection, degradation of the optical characteristic on the photosensitive body 14 will be lesser, the smaller the incident angle is. To prevent the cylindrical mirror 30A from doubly writing by unnecessary light $N_A$ and the cylindrical mirror 30B from doubly writing by unnecessary light $N_B$, the cylindrical mirrors must be arranged so as to secure a space between the beams A and B to some extent in the sub scanning direction. Therefore, it is necessary to determine the incident angles in the sub scanning direction in consideration with the above two conditions.

There will be described the reason why the cylindrical mirrors of the present embodiment do not reflect the unnecessary light.

Figure 6:
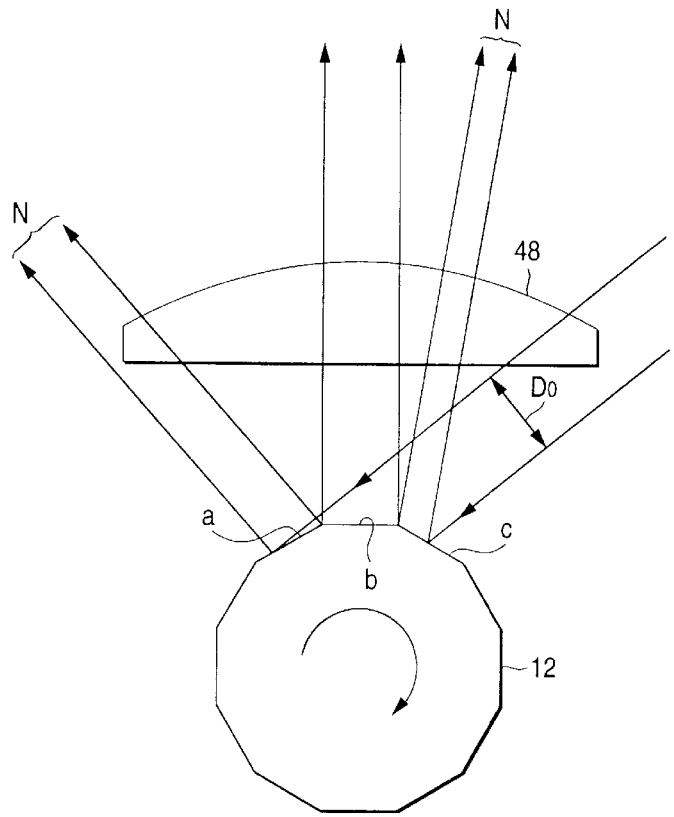
FIG. 6 is a diagram useful in explaining how the unnecessary light is produced.
Figure 7:
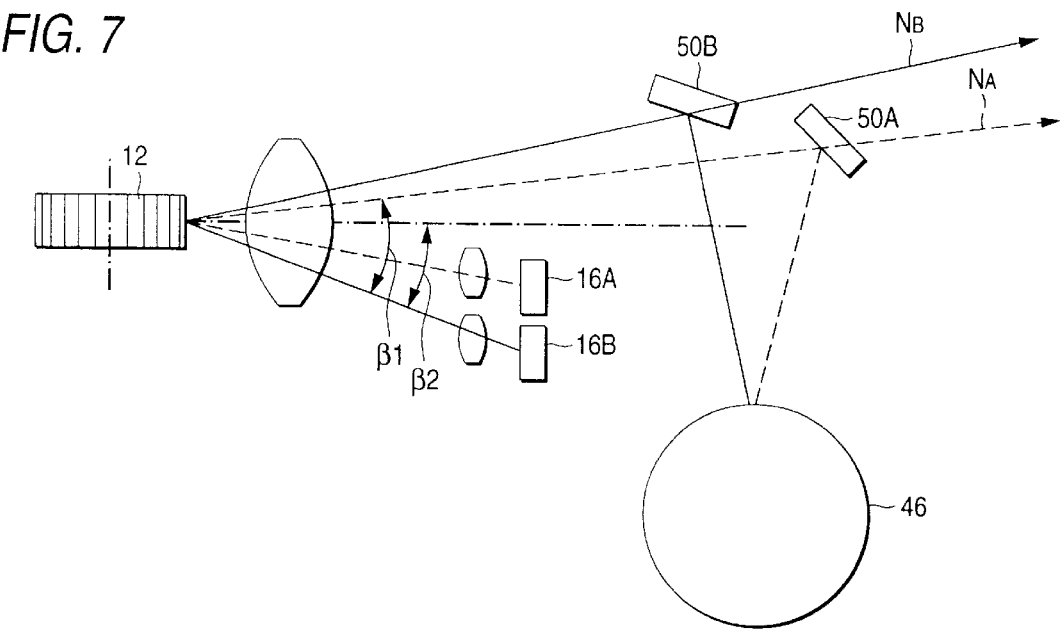
FIG. 7 is a schematic side view showing another conventional optical scanning device.
Figure 8:
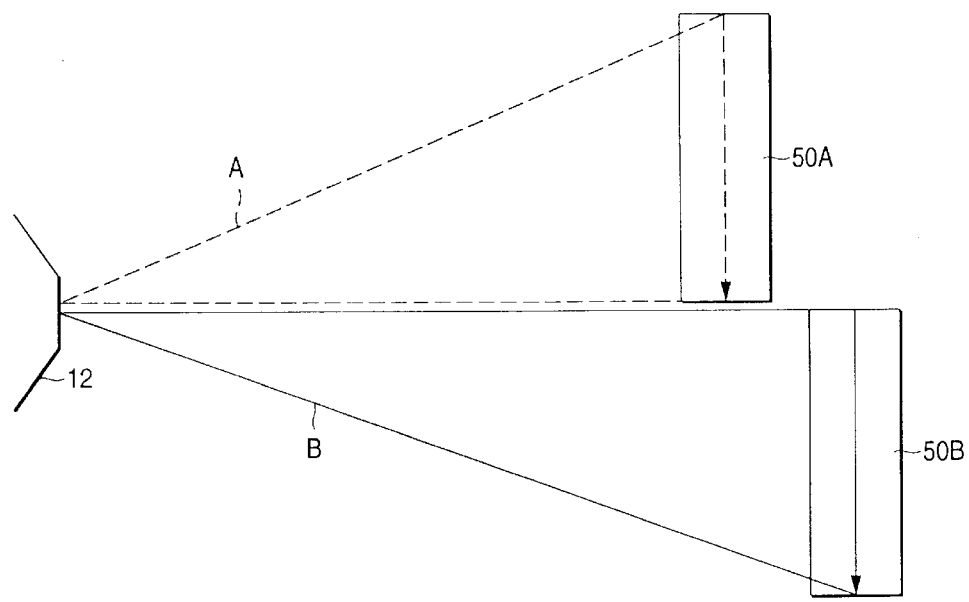
FIG. 8 is a schematic plan view of the conventional optical scanning device shown in FIG. 7.
Figure 9:
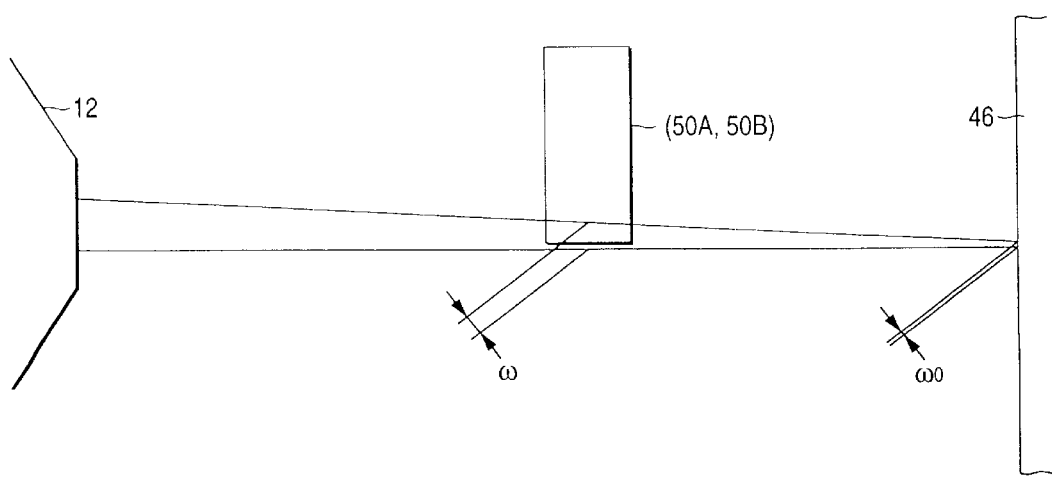
FIG. 9 is a diagram for explaining a relationship between the reflecting mirror and the beam diameter.

As referred to above and seen from FIG. 6, where the overfilled optical system is used, the width ($D_o$) of the bundle of rays of incident light is larger than the width of the facet of the polygon mirror 12. Therefore, the light beams incident on the facet a preceding to the normal reflecting facet b (facet a: located on the rotation start side) and the facet c succeeding to the same (facet c: located on the rotation end side) are reflected by those facets, and the reflected ones are unnecessary light N.

Figure 3:
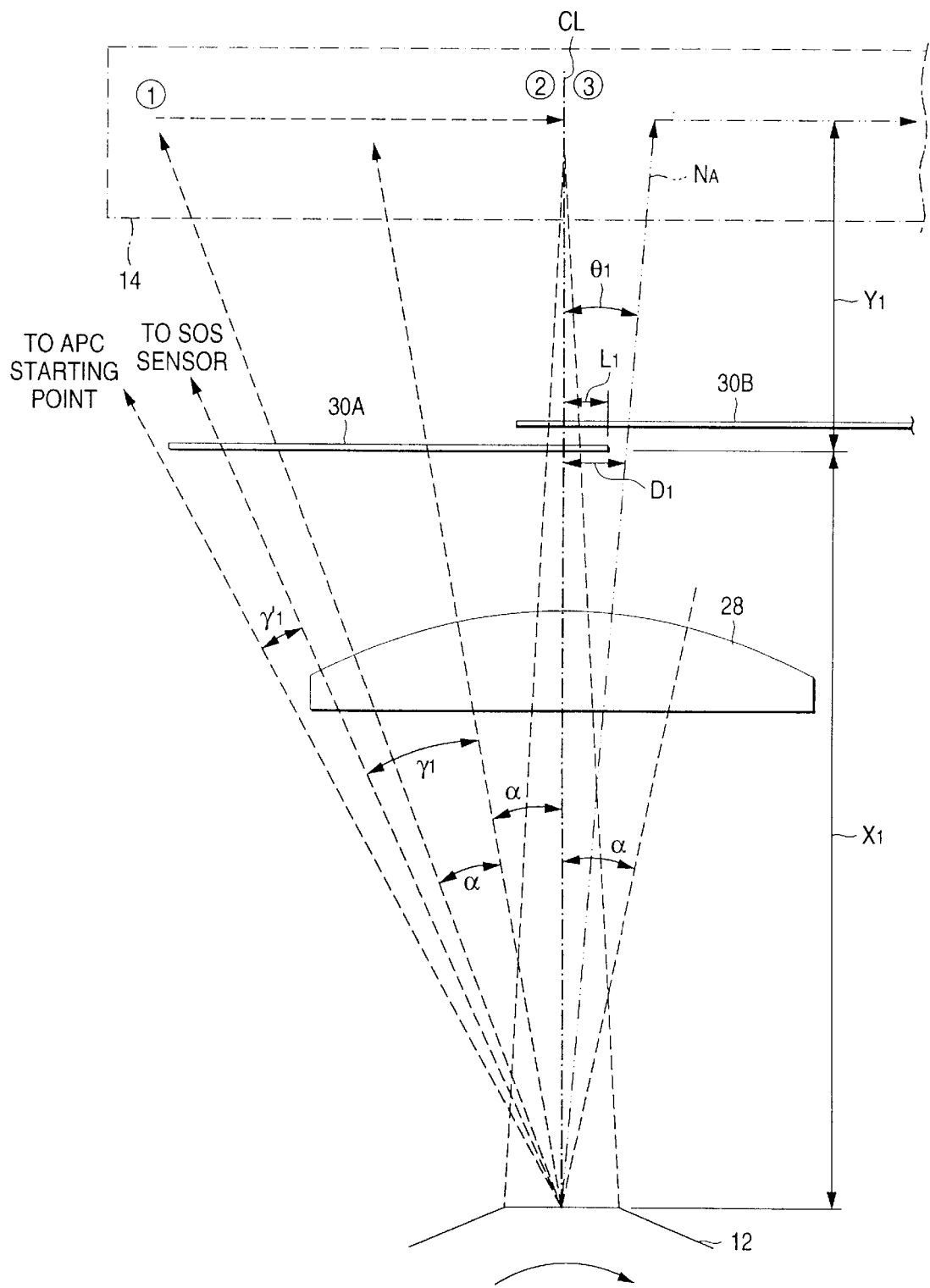
FIG. 3 is an explanatory diagram useful in explaining a positioning of an end portion of the reflecting mirror in the device of FIG. 1 with respect to an unnecessary light.
Figure 4:
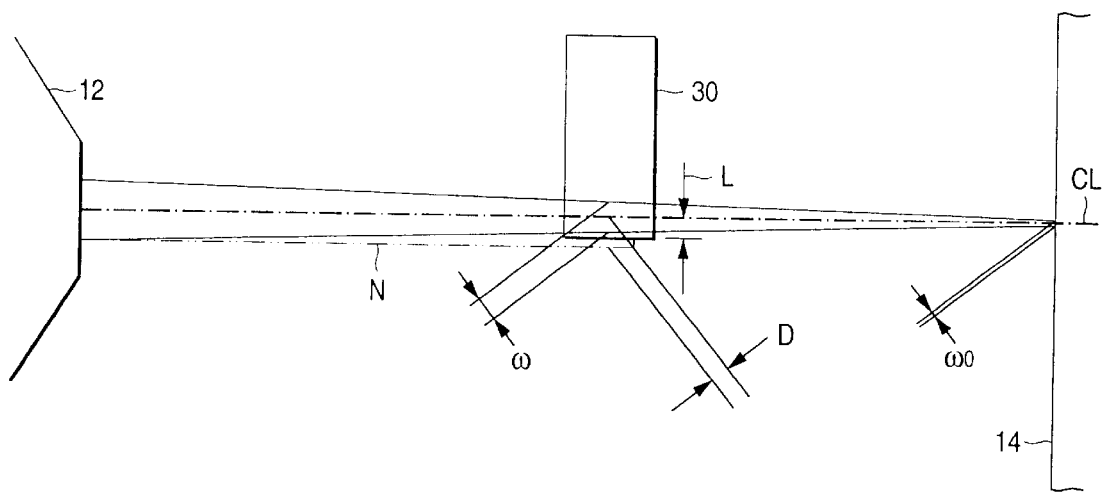
FIG. 4 is an explanatory diagram useful in explaining a positioning of an end portion of the reflecting mirror in the device of FIG. 1 with respect to beam diameter.
Figure 5:
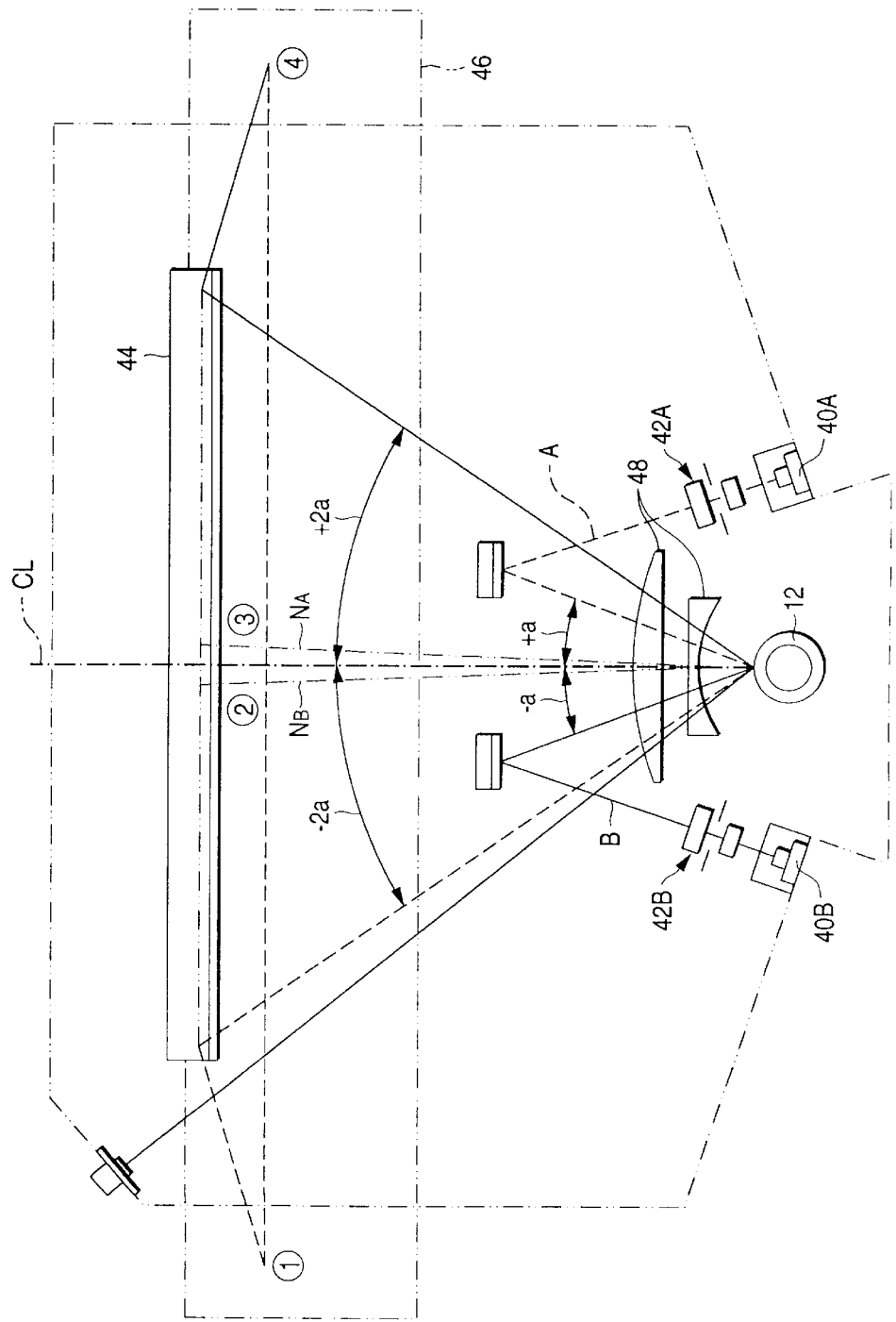
FIG. 5 shows a configuration of a conventional optical scanning device.

This will be further described by use of the laser beam A with reference to FIG. 3. It is assumed that the incident angle is α, the SOS pickup angle is $\gamma_1$, and the number of facets of the polygon mirror is n. An angle range within which the laser beam A can illuminate is ($\gamma_1+\alpha$) by the rotation of the polygon mirror 12. An angle $\theta_1$ at which the succeeding facet c starts to cause the unnecessary light is:

$$\theta_1 = \frac{2 \cdot 360°}{n} - (\gamma_1 + \alpha).$$

The length $L_1$ by which the end of the cylindrical mirror 30A is protruded beyond the center line CL should be appropriately selected within a range within which the mirror does not produce the unnecessary light in accordance with the unnecessary light producing angle $\theta_1$, a position of the reflecting surfaces of the cylindrical mirror 30A (the position: defined by a physical distance $X_1$ on the optical axis from the polygon mirror 12 to the cylindrical mirror 30A), and the imaging optical system (set of fθ lenses 26 and 28). If so selected, it is possible to prohibit the double writing by the unnecessary light $N_A$ caused by the adjacent facet even if the divisional scanning method based on the overfilled optical system are employed.

As recalled, in the optical scanning device under discussion, the SOS signal is served for controlling the writing start positions of both the beams A and B. This reduces the angle ranges allowing the beams A and B to illuminate (FIG. 1). The result is that the region causing the unnecessary light is minimized.

The angle range allowing the laser beam B to illuminate may be set within the print area. The angle $\theta_2$ to start the causing of unnecessary light is satisfactorily large, $$\theta_2 = \frac{2 \cdot 360°}{n} - \alpha.$$

This increases the degree of freedom to arrange the cylindrical mirror 30B. The optical scanning device may be constituted that the laser light control (APC; Auto Power Control) is applied before the SOS detection (namely, when the deflected beam is in a position outer than the SOS sensor with respect to the central line). In this case, the angle range allowing both the beams A and B to illuminate is $$\gamma_1'+\gamma_1+3\alpha.$$

where, $\gamma_1'$ is an angle between an APC starting point and the $\gamma_1$. Thus, the angle $\theta_1$ to start the causing of unnecessary light is, $$\theta_1 = \frac{2 \cdot 360°}{n} - (\gamma_1' + \gamma_1 + \alpha).$$

This must be considered when the projection length $L_1$ of the end of cylindrical mirror is determined.

Calculation of the projection length $L_1$ will be described by use of a specific example and with reference to FIG. 3.

It is assumed that: the number of facets of the polygon mirror 12, n=24; incident angle (a half of the scan angle), α=12.8°; SOS pickup angle, $\gamma_1$=14.4°. The angle allowing the laser beam A to illuminate is ($\gamma_1+\alpha$). The angle $\theta_1$ when the unnecessary light may be caused at a position closest to the center line CL is, $$\theta_1 = \frac{2 \cdot 360°}{24} - 14.4° + 12.8° = 2.8°.$$

An example used here has the following specification:
1) physical distance $Y_1$ on the optical axis between the cylindrical mirror 30A and the photosensitive body 14 is 96.5 mm;

2) physical distance $X_1$ on the optical axis between the cylindrical mirror 30A and the polygon mirror 12 is 932.9 mm;

3) wavelength $\lambda$ of light emitted from the semiconductor laser as the light source members is 780 nm;

4) the specifications on the fθ lenses 26 and 28 are:

4-1) distance between polygon mirror 12 and fθ lens 26 is 18.5 mm;

4-2) radius of curvature (only in the main scanning direction) of the surface of the fθ lens 26, located closer to the polygon mirror 12 is 170.43 mm;

4-3) radius of curvature of the fθ lens 26, located further from the polygon mirror 12 is infinity;

4-4) thickness of fθ lens 26 is 9 mm;

4-5) refractive index of fθ lens 26 is 1.609110;

4-6) distance between fθ lenses 26 and 28 is 25.998 mm;

4-7) radius of curvature of the polygon mirror 12 closer to the fθ lens 28 is infinity;

4-8) radius of curvature of the surface of the polygon mirror 12 further from the fθ lens 28=122.67 mm;

4-9) thickness of the fθ lens 28 is 10 mm; and 4-10) refractive index of fθ lens 28 is 1.712288.

In the thus specified example, as shown in FIG. 3, distance $D_1$ from the center line CL to the unnecessary-light causing point on the reflecting surface of the cylindrical mirror is: $D_1$=12.6 mm.

If the beam diameter $\omega_o$ in the main scanning direction in the vicinity of the center position of the photosensitive body 14 is 0.06 mm, the diameter the beam A of $\omega_1$ in the main scanning direction on the cylindrical mirror 30 is:

$$\omega_1 = \omega_0 \sqrt{1 + \left(\frac{4\lambda Y_1}{\pi \omega_0^2}\right)^2} = 1.6 \text{ mm}.$$

The projection length $L_1$ is given by $$L_1 < D_1 - \frac{\omega_1}{2}.$$

When the values of $D_1$ and $\omega_1$ are substituting into the above expression, we have $L_1$<12.6 mm–0.8 mm=11.8 mm.

From the above expression, it is seen that if the length $L_1$ by which the end of the cylindrical mirror 30 is projected in the main scanning direction beyond the center line CL is selected to be shorter than 11.8 mm, no unnecessary light reaches the photosensitive body 14 and the formation of the dot can be secured.

When considering the adjustment in the stage of assembling, it is desirable that the projection length $L_1$ is as long as possible. If $L_1$ is 11 mm, and the related values is substituted into the following expression, $$D_1 > L_1 > \frac{\omega_1}{2} + \frac{2X_1}{X_1 + Y_1} + a_1,$$

where $\alpha_1$ designates distance from the end of the reflecting mirror to the effective reflecting surface (generally, 1 mm), then we have 12.6 mm>11 mm>0.8 mm+1.55 mm+1 mm=3.35 mm This value is satisfactorily large.

In the above embodiment, the output signal of the SOS sensor 32 is served for controlling the start positions of writing by both the beams A and B. If necessary, the SOS signal may be used for controlling the writing start position of the laser beam A, while an EOS (end of scan) signal may be used for controlling the writing start position of the laser beam B. The EOS signal is generated at the end of the scan of the surface of the photosensitive body 14, and used for controlling the writing start position of the next line.

By so doing, the angle ranges allowing the beams A and B to illuminate is large, and the region causing the unnecessary light is also large. However, when a joining position between the two beams is adjusted, the positions of those beams can be detected independently, and hence it is very useful for the electrical adjustment.

Any modification or variation can be applied to the above-mentioned device without departing from scope and sprit of the present invention.

For example, it is possible to select length $L_2$ by which the end of the cylindrical mirror 30B is protruded beyond the center line CL should be appropriately selected within a range within which the mirror does not produce the unnecessary light $N_B$ in accordance with the above-mentioned way of calculation. Wherein, physical distance $Y_2$ on the optical axis between the cylindrical mirror 30B and the photosensitive body 14 and physical distance $X_2$ on the optical axis between the cylindrical mirror 30B and the polygon mirror 12 are substantially the same values as $Y_1$ and $X_1$ respectively. If so selected, the double writing problem can be avoided more certainly.

As has been described heretofore, according to the present invention, with the use of the overfilled optical system, an optical scanning device of high speed and high resolution performances is realized without increasing the diameter of the polygon mirror, and with the use of the divisional scanning method, a broad scan width can be secured without increasing the focal distance (optical path length).

In addition to the above advantages, the double writing problem can be solved, and the formation of the dot in the vicinity of the joining point of the two beams is secured.

According to the present invention, to cope with troubles arising from mounting errors of optical parts and errors produced when the optical scanning device is assembled into the image forming apparatus, the projecting length of the cylindrical mirror is set to be large. Therefore, the beam joining position may be easily adjusted by changing the position of the dot as visual representation of image data.

According to the present invention, the projecting length of the cylindrical mirror is set to be large allowing for the length from the end of the reflecting mirror to the effective reflecting surface. Therefore, reliable formation of the dot is secured.

According to the present invention, the angle range allowing the beam deflected by the rotation-end face of the polygon mirror to illuminate is confined within the printing area. As a result, the angle ranges allowing both the beams to illuminate are reduced.

According to the present invention, when a joining position between the two beams is adjusted, the positions of those beams can be detected independently, and hence it is very useful for the electrical adjustment.

What is claimed is:

1. An optical scanning device comprising:
   a multi-faceted rotating polygon mirror for deflecting an incident beam in main scanning direction;
   a first light source for bringing a first beam into incidence on the polygon mirror at an angle of +α with respect to a central line connecting from a rotation center of the polygon mirror to a central position of a scanned surface, the first light source arranged such that the first beam is deflected at an angle of $-2\alpha$ by while the polygon mirror rotates at an angle of $\alpha$;

a second light source for bringing a second beam into incidence on the polygon mirror at an angle of $-\alpha$ with respect to the central line, the second light source arranged such that the second beam is deflected at an angle of $+2\alpha$ by while the polygon mirror rotates at an angle of $\alpha$;

a first reflecting mirror for scanning the scanned surface by reflecting the deflected first beam, the first reflecting mirror arranged so one end portion thereof as to cross over the central line and to avoid an unnecessary beam from reflection faces adjoining to a normal reflection face of the polygon mirror; and a second reflecting mirror for scanning the scanned surface by reflecting the deflected second beam.

2. The optical scanning device as set forth in claim 1, wherein length $L_1$ from the end portion to the central line satisfies the following expression, $$\frac{\omega_1}{2} < L_1 < D_1 - \frac{\omega_1}{2},$$

where $\omega_1$ is diameter of the first beam in the main scanning direction at a surface of the first reflection mirror; and $D_1$ is distance between the central line and the unnecessary beam.

3. The optical scanning device as set forth in claim 2, wherein the second reflecting mirror arranged so one end portion thereof as to cross over the central line and to avoid an unnecessary beam from the polygon mirror, and length $L_2$ from the end portion to the central line satisfies the following expression, $$\frac{\omega_2}{2} < L_2 < D_2 - \frac{\omega_2}{2},$$

where $\omega_2$ is diameter of the second beam in the main scanning direction at a surface of the second reflection mirror; and $D_2$ is distance between the central line and the unnecessary beam.

4. The optical scanning device as set forth in claim 1, wherein length $L_1$ from the end portion to the central line satisfies the following expression, $$\frac{\omega_1}{2} < L_1 < D_1,$$

where $\omega_1$ is diameter of the first beam in the main scanning direction at a surface of the first reflection mirror; and $D_1$ is distance between the central line and the unnecessary beam.

5. The optical scanning device as set forth in claim 4, wherein the second reflecting mirror arranged so one end portion thereof as to cross over the central line and to avoid an unnecessary beam from the polygon mirror, and length $L_2$ from the end portion to the central line satisfies the following expression, $$\frac{\omega_2}{2} < L_2 < D_2,$$

where $\omega_2$ is diameter of the second beam in the main scanning direction at a surface of the second reflection mirror; and $D_2$ is distance between the central line and the unnecessary beam.

6. The optical scanning device as set forth in claim 1, wherein length $L_1$ from the end portion to the central line satisfies the following expression, $$\frac{\omega_1}{2} + \frac{2X_1}{X_1 + Y_1} < L_1 < D_1,$$

where $\omega_1$ is diameter of the first beam in the main scanning direction at a surface of the first reflection mirror; $D_1$ is distance between the central line and the unnecessary beam; $X_1$ is physical distance on the optical axis between the polygon mirror and the first reflecting mirror; and $Y_1$ is physical distance between the first reflecting mirror and the scanned surface.

7. The optical scanning device as set forth in claim 6, wherein the second reflecting mirror arranged so one end portion thereof as to cross over the central line and to avoid an unnecessary beam from the polygon mirror, and length $L_2$ from the end portion to the central line satisfies the following expression, $$\frac{\omega_2}{2} + \frac{2X_2}{X_2 + Y_2} < L_2 < D_2,$$

where $\omega_2$ is diameter of the second beam in the main scanning direction at a surface of the second reflection mirror; $D_2$ is distance between the central line and the unnecessary beam; $X_2$ is physical distance on the optical axis between the polygon mirror and the second reflecting mirror; and $Y_2$ is physical distance between the second reflecting mirror and the scanned surface.

8. The optical scanning device as set forth in claim 1, wherein length $L_1$ from the end portion to the central line satisfies the following expression, $$\frac{\omega_1}{2} + \frac{2X_1}{X_1 + Y_1} + a_1 < L_1 < D_1,$$

where $\omega_1$ is diameter of the first beam in the main scanning direction at a surface of the first reflection mirror; $D_1$ is distance between the central line and the unnecessary beam; $X_1$ is physical distance on the optical axis between the polygon mirror and the first reflecting mirror; $Y_1$ is physical distance between the first reflecting mirror and the scanned surface; and $\alpha_1$ is distance between the end portion of the first reflecting mirror and an effective reflecting face.

9. The optical scanning device as set forth in claim 8, wherein the second reflecting mirror arranged so one end portion thereof as to cross over the central line and to avoid an unnecessary beam from the polygon mirror, and length $L_2$ from the end portion to the central line satisfies the following expression, $$\frac{\omega_2}{2} + \frac{2X_2}{X_2 + Y_2} + a_2 < L_2 < D_2,$$

where $\omega_2$ is diameter of the second beam in the main scanning direction at a surface of the second reflection mirror; $D_2$ is distance between the central line and the unnecessary beam; $X_2$ is physical distance on the optical axis between the polygon mirror and the second reflecting mirror; $Y_2$ is physical distance between the second reflecting mirror and the scanned surface; and $\alpha_2$ is distance between the end portion of the second reflecting mirror and an effective reflecting face.

10. The optical scanning device as set forth in claim 1, wherein a scanning start signal, which is generated to control a writing start position before starting the scanning for the scanned surface, is served for controlling writing start positions of the first beam and the second beam.

11. The optical scanning device as set forth in claim 1, wherein a first scanning start signal, which is generated to control a writing start position before starting the scanning for the scanned surface, is served for controlling a writing start position of the first beam, and a second scanning start signal, which is generated to control a next writing start position after terminating the present scanning, is served for controlling a writing start position of the second beam.

* * * * *